United States Patent [19]

Clevett

[11] 3,896,786

[45] July 29, 1975

[54] SOLAR STOVE

[75] Inventor: Merton L. Clevett, Englewood, Calif.

[73] Assignee: Solar Products Corporation, Denver, Colo.

[22] Filed: May 29, 1973

[21] Appl. No.: 364,366

[52] U.S. Cl.............. 126/270; 229/8; 229/41 C; 250/292
[51] Int. Cl.............................................. F24j 3/02
[58] Field of Search ........ 126/270, 271; 250/292 X, 250/299 X; 229/8 X, 41 C X

[56] References Cited
UNITED STATES PATENTS

| 2,304,373 | 12/1942 | Palmer | 229/41 C |
| 3,025,851 | 3/1962 | Steinberg | 126/270 |
| 3,028,856 | 4/1962 | Daymon | 126/270 |
| 3,038,463 | 6/1962 | Daymon | 126/270 |
| 3,053,248 | 9/1962 | Daymon | 126/270 |
| 3,106,201 | 10/1963 | Steinberg | 126/270 |
| 3,738,563 | 6/1973 | Eifrid | 229/41 C |

Primary Examiner—William F. O'Dea
Assistant Examiner—Peter D. Ferguson

[57] ABSTRACT

A portable solar stove, which can also be used as an insulated food container or table, has a foil-lined oven portion and upwardly divergent arcuate reflective petaloid panels adapted to reflect solar radiation through a clear plastic window into the oven portion of the stove. The reflective petaloid panels are releasably connected in a desired orientation to assure the desired reflection of the sun's radiation into the oven portion and to rigidify the petaloid panel assemblage so that they can serve as support legs for a table when the stove is inverted.

9 Claims, 9 Drawing Figures

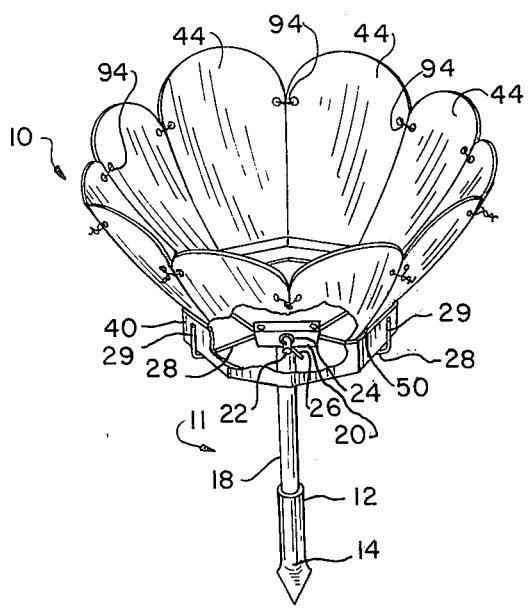
Fig_1
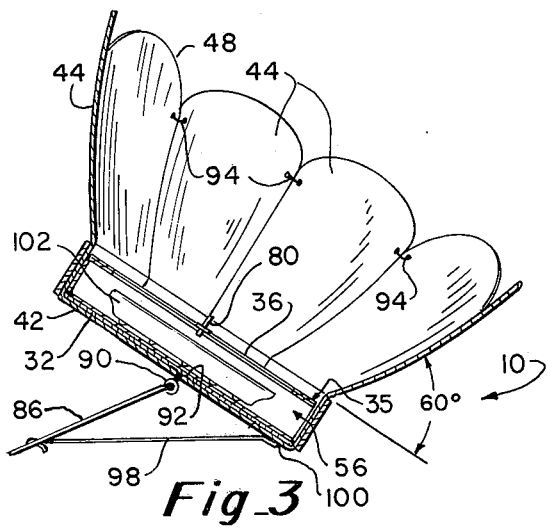
Fig_3
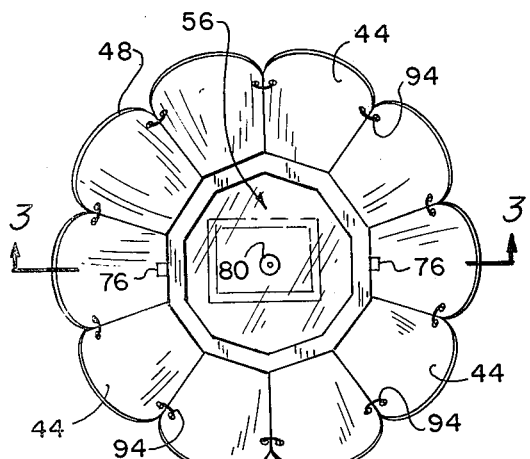
Fig_2
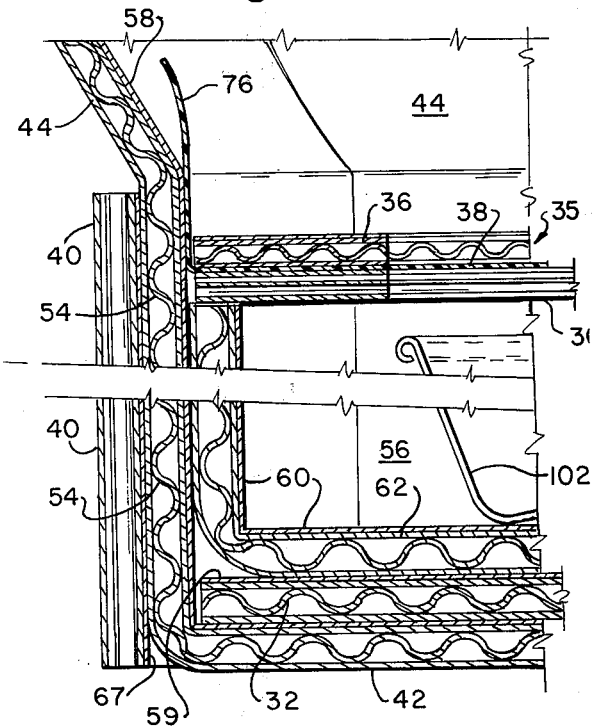
Fig_4
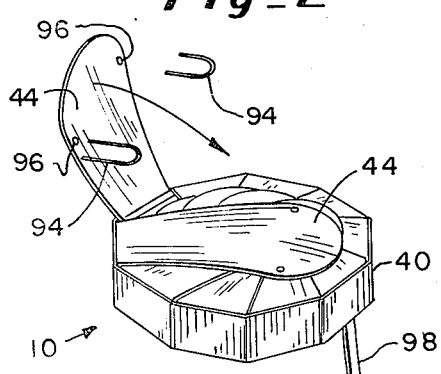
Fig_5
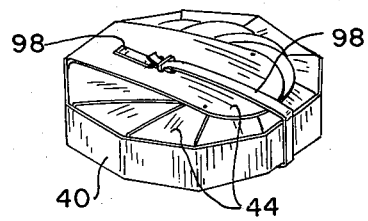
Fig_6

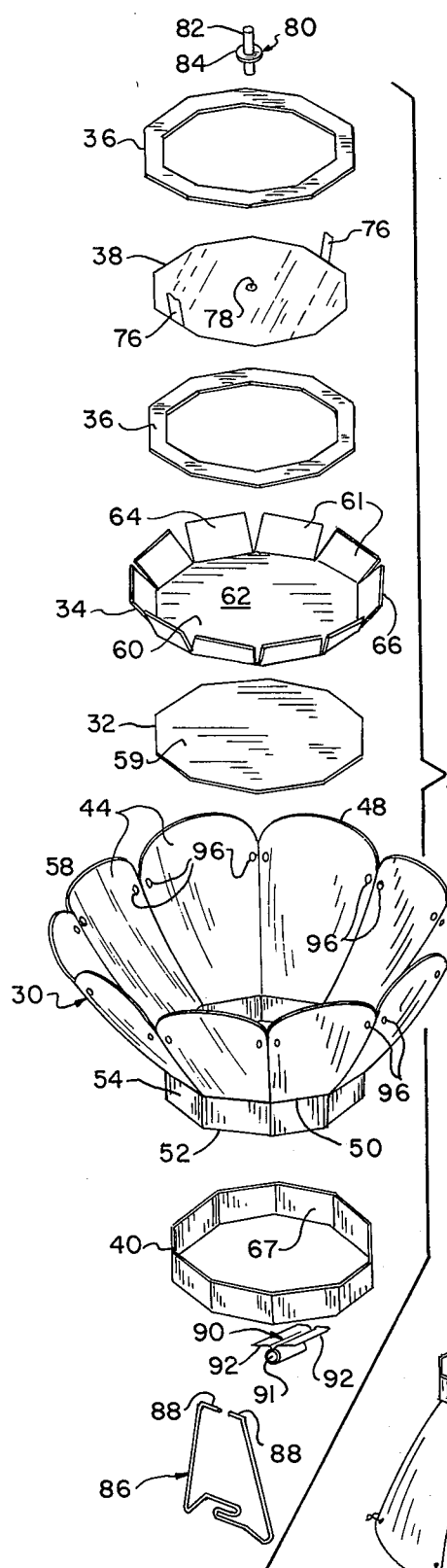
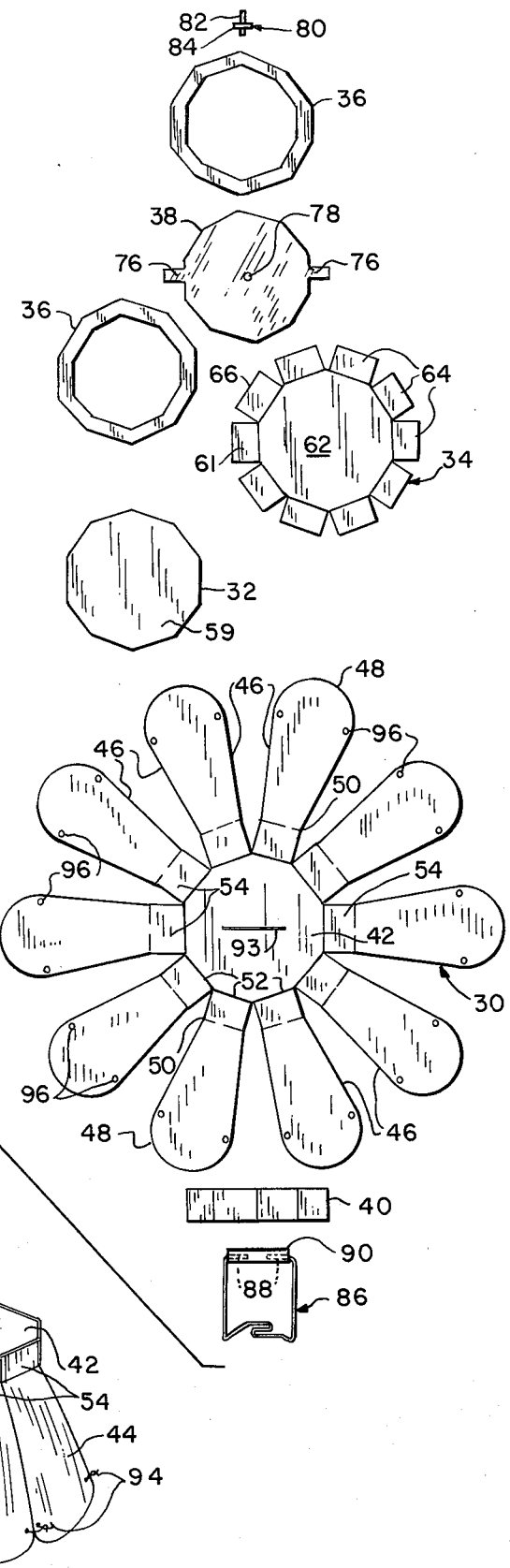
Fig_7
Fig_8
Fig_9

SOLAR STOVE

The present invention generally relates to solar cooking apparatus or equipment and more particularly to an improved form of solar cooking apparatus which is convertible into an insulated food container and table.

For years, scientists have been aware of the tremendous energy emanated from the sun and while numerous attempts have been made at harnessing this energy, the resulting apparatusses have been unwieldy and therefore, not well suited for use as portable cooking stoves or the like and particularly as portable cooking stoves which also serve other affiliated functions.

It is a primary object of the present invention to provide a new and improved solar stove of a convenient-to-handle size and capable of generating temperatures in excess of 500°F.

It is another object of the present invention to provide a portable solar stove which can be folded into a portable insulated food container or inverted and used as an eating table.

It is another object of the present invention to provide a portable light-weight solar stove made of foil-lined corrugated paper and designed to retain the heat energy emanated from the sun in a manner such that the energy is utilized to cook food by radiation, conduction, and convection.

It is another object of the present invention to provide a portable solar stove having an enclosed oven portion with pivotal reflective petaloid panels movable from a folded position overlying the oven portion to an unfolded position in which they are unified into a cupped reflector adapted to reflect sun rays into the oven portion of the stove.

It is still another object of the present invention to provide a portable light-weight solar stove made of foil-lined corrugated paper and having an oven portion with triple wall thickness to adequately retain the solar energy.

These and other objects of the present invention are attained with a light-weight portable apparatus which in a folded condition serves as a portable insulated food container and which can be unfolded into a convenient sized solar stove capable of generating temperatures in excess of 500°F or which can be inverted and used as a table. The stove is made from blanks of non-conductive material such as corrugated paper which have been lined on one surface with a bright reflective foil and assembled to define an oven portion with outwardly flaring reflective petaloid panels. The oven portion has a triple wall thickness so as to adequately retain solar radiation which passes into the oven portion through a removable transparent plastic window. The reflective petaloid panels are pivotally connected to the oven portion around its perimeter so as to be movable from a folded position overlying the oven portion to an unfolded or expanded position wherein they are releasably connected together in a unified cup shaped reflector designed to reflect solar radiation into the oven portion of the apparatus where it is collected and through radiation, conduction and convection utilized to cook foods, heat materials and the like. The device is also provided with a direction finder so that it can be accurately aligned with the sun for maximum utilization of the solar radiation.

It will be more appreciated with the detailed description hereinafter, that when the reflective petaloid panels are expanded and unified as mentioned previously, the apparatus can be inverted so that the reflective petaloid panels serve as support legs for an eating table or the like with the back face of the oven portion serving as the table top.

Other objects, advantages and capabilities of the present invention will become more apparent as the description proceeds taken in conjunction with the accompanying drawings, in which:

FIG. 1 is a perspective view of the solar stove apparatus of the present invention mounted on one form of support stand and with the reflective petaloid panels unfolded, FIG. 2 is a top plan view of the solar stove of the present invention, FIG. 3 is a vertical section taken along line 3–3 of FIG. 2 and showing an alternate form of support stand, FIG. 4 is an enlarged fragmentary vertical section showing a portion of the apparatus as illustrated in FIG. 3, FIG. 5 is a perspective view of the solar stove of FIG. 1 with all of the reflective petaloid panels but one in a folded condition, FIG. 6 is a perspective view similar to FIG. 5 with all of the petaloid panels folded and secured in place, FIG. 7 is an exploded perspective view of the solar stove of the present invention with the alternate form of support stand shown in FIG. 3, FIG. 8 is an exploded plan view of the solar stove of the present invention with the encompassing band and alternate form of support stand shown in elevation, and FIG. 9 is a perspective view of the solar stove of the present invention as it may be utilized as an eating table.

Referring first to FIG. 1, the solar stove apparatus 10 of the present invention is seen mounted on a stand 11 which is adapted to selectively position the stove in any one of various positions to properly align the stove with the sun. The stand 11 shown in FIG. 1 has an anchor sleeve 12 with a pinched lower end 14 that can be easily driven into the ground to stabilize the stand 11. A support rod 18 is slidably received in the anchor sleeve 12 and can be releasably secured therein by forcing the lower end of the support rod 18 into the reduced diameter pinched lower end 14 of the anchor sleeve where the rod is retained by friction. A bracket 20 having an inverted U-shaped transverse cross-section is pivotally attached to the upper end of the support rod 18 by a bolt 22 passing through aligned openings in the sides of the bracket 20 and an opening through the upper end of the support rod 18. A nut 24 having an integral lever arm 26 thereon is threaded onto the end of the bolt 22 so that when it is tightened onto the bolt, it will draw the sides of the bracket 20 into frictional engagement with the support rod 18 to fixidly position the bracket in a selected angular orientation relative to the support post. Pairs of rigid support arms 28 having upturned outer ends 29 are anchored to the bracket 20 and extend outwardly therefrom so as to cooperate with the bracket in establishing a seat for the solar stove 10. The upturned ends 29 of the support arms 28 extend upwardly along the sides of the stove 10 to retain the stove in the seat. It will, therefore, be appreciated that when the stove 10 is seated on the stand 11 it can be oriented in any desired orientation, for purposes to be described in more detail later, by pivoting the support rod 18 within the anchor sleeve 12 and pivoting the bracket 20 and support arms 28 relative to the support rod 18.

The stove 10 is probably best described by reference to FIGS. 7 and 8 wherein the component parts thereof have been exploded. The solar stove 10 includes a petaloid panel base assembly 30, having a spacer insert 32 seated therein, an oven liner 34 seated on top of the spacer insert 32, an oven window 35 comprised of window frame members 36 on either side of a transparent window pane 38 and a retention band 40 adapted to fit externally around the petaloid panel base assembly 30 to retain the stove in an assembled condition.

The petaloid panel base assembly 30 is seen best in FIG. 8 to be made of a blank piece of non-conductive material such as corrugated paper, having a symmetrical decagon bottom 42 with integral petaloid panels 44 radiating outwardly from each side of the decagon bottom 42. Each petaloid panel is identical and has sides 46 which are slightly divergent outwardly and a substantially semi-circular outer end 48. A transverse bend 50 in each petaloid panel is spaced slightly from its integral connection 52 to the decagon bottom providing a pivotal joint in the petaloid panel and defining a rectangular inner section 54 of each petaloid panel adjacent the bottom. Also, at the connection 52 of each petaloid panel with the decagon bottom 42, the blank corrugated paper is bent establishing a pivotal connection of each petaloid panel 44 to the bottom 42. The blank from which the petaloid panel base assembly 30 is made from is, therefore, adapted to be folded into the configuration shown in FIG. 7 wherein the inner section 54 of each petaloid panel 44 is folded to form a right angle with the decagon bottom 42 of the assembly 30 and the remainder of the petaloid panel angles outwardly so as to form approximately a 60° angle with the decagon bottom. The inner section 54 of each petaloid panel can be seen to define one side of a continuous ten sided wall around the bottom 42 with the space encompassed by the ten sided wall being defined as the oven portion 56 of the stove. The inwardly directed face of the corrugated paper blank from which the petaloid panel base assembly 30 is made has a bright aluminum foil lining 58, preferably approximately 0.0003 inches thick, which is well suited for reflecting the suns radiation. Each of the petaloid panels 44 has a slightly concave, substantially parabolic longitudinal cross-section so that parallel sun rays which are normal to the bottom of the petaloid panel base assembly will be reflected by the petaloid panels into the center of the decagon bottom 42.

The spacer insert 32 is merely a disc of non-conductive material, such as corrugated paper, having a bright aluminum foil lining 59 on its top surface and having a decagon configuration so as to conform with the bottom of the petaloid panel base assembly 30. Accordingly, when the spacer insert 32 is placed in the petaloid panel base assembly 30, it serves to double the thickness of the bottom of the assembly 30 and additionally adds a second reflective layer of aluminum foil to the bottom of the stove to prevent heat from passing downwardly through the assembly.

The oven liner 34, as probably best seen in FIG. 8, is also made of non-conductive material, such as corrugated paper with an aluminum foil lining 60 on its upper face 61 and has a decagon bottom portion 62 with integral rectangular tabs 64 radiating outwardly from and pivotally connected to the sides of the bottom portion 62. The tabs 64 are adapted to be folded upwardly, as shown in FIG. 7, so that the oven liner 34 can be inserted into the petaloid panel base assembly 30 in overlying relationship with the spacer insert 32 and with the tabs 64 engaging the inner foil lined surface of the inner portions 54 of each petaloid panel. As will be explained more clearly hereinafter, the top edges 66 of the tabs 64 define an annular supporting surface on which the window 35 is seated. It will be readily apparent that with the oven liner 34 inserted in the petaloid panel base assembly 30, the bottom thickness of the device is tripled with each layer having a foil lining to help prevent heat loss through the bottom layers of the stove. The sides of the oven portion 56 of the device are doubled in thickness when the oven liner 34 is inserted in the petaloid panel base assembly 30 to prevent heat loss through the sides of the stove.

The retention band 40 is also made of non-conductive material, such as corrugated paper and has a decagon horizontal transverse cross-section with an open top and bottom so that it can be slid upwardly around the inner portion 54 of the petaloid panels to rigidify and unify the stove 10 and also to triple the thickness of the side walls. The inwardly directed surface of the retention band 40 also has an aluminum foil lining 67 so that the entire oven portion 56 of the stove 10 has a triple thickness with three layers of reflective aluminum foil to retain the heat in the oven portion. The band 40 is approximately as deep as the inner portion 54 of the petaloid panels but has a horizontal cross-sectional size such that it is forcefitted around the inner portions of the petaloid panels to hold the component parts of the stove in compression.

The window element 35 has two frame members 36 each of decagon configuration. The frame members 36 are also made of non-conductive material, such as corrugated paper and circumscribe opposite sides of the window pane 38. The frame members 36 may be stapled together to retain the window pane 38 in sandwiched relationship therewith and preferably, the corrugations in the window frame members are disposed at 90° to each other to obtain maximum rigidity for the window element. The window pane 38 is also of decagon configuration and has diametrically opposed pull tabs 76 extending outwardly from the edge thereof to facilitate removal and placement of the window element into the device. The window pane 38 is preferably made of a plastic polycarbonate film and in the preferred embodiment, is between 3 and 15 mils thick to adequately retain heat in the oven portion 56 of the stove 10 even in extremely cold ambient temperatures. As mentioned previously, the window element is adapted to be seated on the upper edges 66 of the tabs 64 on the oven liner 34 to retain a constant spacing between the window element and the bottom 62 of the oven liner. Preferably, the height of each of the tabs 64 on the oven liner 34 is slightly less than the height of the bottom portion 54 of the petaloid panels 44 so that when the window element is seated on the upper edges 66 of the tabs, the edges of the element are retained under compression by the retention band 40 which, as mentioned previously, supports the inner portion 54 of the petaloid panels and the tabs 64 in a tight compressed upright position.

For purposes of accurately aligning the stove 10 with the sun, the window pane 38 is provided with a centrally located vent aperture 78 which releasably receives a direction finder 80. The direction finder 80 as seen in FIGS. 7 and 8, is comprised of an elongated cylindrical pin 82 with a perpendicular circumscribing disc 84 thereabout which is spaced from the ends of the pin 82 so that one end of the pin can be inserted into the vent opening 78 in the window pane 38 with the disc 84 abutting the window pane and thereby retaining the pin 82 in a perpendicular relationship with the window pane 38. By moving the stove 10 until the pin 82 casts no shadow on the disc portion 84 of the direction finder 80, the stove 10 can be aligned with the sun so that the sun rays are normal to the window pane 38 and will be reflected by the petaloid panels 44 into the oven portion 56. After the stove has been properly aligned, the direction finder 80 can be removed and the vent hole 78 will thereafter serve as a vent to prevent pressure buildup in the oven portion 56 of the device.

If the support stand 16 shown in FIG. 1 is not utilized to support the stove 10, a stand 86, shown in FIGS. 3, 7 and 8 may be utilized to brace the stove 10 so that it remains aligned with the sun. The stand 86 can be seen best in FIGS. 7 and 8 to comprise a substantially U-shaped metal frame having inwardly turned end portions 88. The end portions 88 are adapted to be releasably inserted into opposite ends of an open tubular connector 90 anchored to the bottom of the petaloid panel base assembly 30. The connector 90, which is also seen best in FIGS. 7 and 8, is merely comprised of a sheet of flexible metal which has been bent to have a cylindrical passage 91 therein with ears 92 extending away therefrom so that the ears can be inserted into a slot 93 provided in the bottom of the petaloid panel base assembly 30 and thereafter spread laterally to secure the connector 90 to the bottom of the petaloid panel base assembly with the tubular portion thereof adjacent the bottom face of the bottom. It will, therefore, be appreciated that when the stand 86 is releasably connected to the connector 90, it can be pivoted into any desired position to brace the stove 10 and thereby retain the stove in the desired position relative to the sun.

When using the device to cook food or for otherwise heating materials, the petaloid panels 44 are connected along adjacent edges so that they are self-supporting as seen best in FIGS. 1 through 3. While numerous means for connecting the petaloid panels could be employed, it has been found convenient and desirable to connect the petaloid panels with flexible wires 94, such as pipe cleaners, which extend through openings 96 provided adjacent the outer ends of each side of the petaloid panel and are connected adjacent the outer faces of the petaloid panels 44.

When it is desired to fold the stove for transportation purposes or to use the device as an insulated food container, the wire connectors 94 are first removed from the petaloid panels 44 and the petaloid panels are folded one-at-a-time inwardly into overlying relationship with the window element 35. It will be appreciated that as the petaloid panels 44 stack up above the window element in their folded positions, they are naturally curved in extending from the side edge of the oven portion 56 of the stove across the window element. This curve established in the petaloid panels is approximately parabolic so that, as mentioned hereinbefore, when the petaloid panels are unfolded, as shown in FIGS. 1 through 3, they will desirably reflect parallel sun rays into the oven portion 56 of the stove. Another important feature of the invention is that when the petaloid panels are folded in overlying relationship with the window element, the inner foil-lined surfaces 58 of the petaloid panels 44 are directed downwardly and through the transparent window element so that the oven portion 56 of the device is completely lined with reflective foil and is at least triple the thickness of one of the corrugated paper panels so as to define an insulated compartment in which food can be retained either cold or hot for extended periods of time.

As seen in FIGS. 5 and 6, the device is retained in the folded position by flexible straps 98, one of which is anchored to the bottom of the device and the other of which is anchored to the uppermost ones of the stacked petaloid panels so that when the ends of the straps 98 are fastened, the petaloid panels are held tightly against the window element 72 in a compact manner. It will be appreciated that the attachment strap 98 thereby not only serves to secure the stove 10 in a compact unit but can also be used as a handle. The strap 98 can additionally be used to establish a second connection of the stand 86 to the bottom of the petaloid panel base assembly to reliably position the stove relative to the sun.

When using the solar stove 10 of the present invention, the petaloid panels 44 are first connected in their expanded position shown in FIGS. 1 through 3, and the window element 35 removed by lifting the pull tabs 76 to remove the window element from its seated position on the oven liner 34. Food or other material to be heated is then placed in the oven portion 56 of the device and preferably fixed relative to the oven liner 34 so that the stove can be tilted to be aligned with the sun without the food or other material shifting positions within the oven portion 56. To this end, it has been found convenient to place the food or other material in a commercially available plastic cooking bag and to anchor the bag to the bottom of the foil liner in any convenient manner. However, the food could also be placed in a removable pan 102 such as shown in FIGS. 2 and 4, which could also be suitably anchored to the oven liner 34 to retain its position. It has been found that for best results, either the bottom of the oven liner 34 or the bottom of the cooking pan 102 be coated with a black epoxy or black cooking foil to absorb heat. While this is not necessary, it has been found to more rapidly raise the temperature in the oven portion of the stove. After the food or other material has been desirably positioned in the oven portion 56, the window element 35 is again seated on the top edge of the oven liner 34 and the direction finder 80 inserted into the vent opening 78 in the window pane 38. The stove 10 is then oriented so that the direction finder 80 casts no shadow and one of the stands 11 or 86 positioned to retain the stove device in this orientation.

The solar stove apparatus 10 of the present invention has been found to preheat up to 450°–500° F in eight minutes even though it is of a compact easy to handle size. In fact, in the preferred embodiment shown, the total span between diametrically opposed outer edges of the petaloid panels need be no more than twenty inches. Furthermore, the device when folded is of a convenient size and weight to carry and transport food if desired and can be inverted in the unfolded condition, as shown in FIG. 9, and used as an eating table with the bottom of the petaloid base assembly as the table top and the petaloid panels as the legs.

Although the present invention has been described with a certain degree of particularity, it is understood

What is claimed is:

1. A solar stove apparatus comprising in combination:
   a plurality of identical solar-reflective panel means, each of said panel means being generally in the form of a concave petaloid,
   a base assembly having an open topped box-like oven portion, said solar-reflective panel means including common inner portions adapted to be seated in said base assembly and outer portions pivotally attached to the oven portion for movement between a folded position overlying the top of the oven portion in stacked relationship with each other and an unfolded position in which said panel means radiate outwardly from the open top of the oven portion each petaloid being concave in the direction of radiation away from said open top,
   a retention band of non conductive material defining a ring tightly fitting and conforming to the outside of the inner portions of the said reflective panel means,
   attachment means releasably attaching the said solar-reflecting panel means in edge-to-edge relationship to one another in the unfolded position,
   a transparent window element removably covering the open top of the oven portion to selectively enclose the oven portion, said panel means in the unfolded position being adapted to reflect solar radiation through the window element and into the oven portion of the apparatus, and
   support means operative to support said base assembly such that said base assembly can be selectively positioned and retained in a desired directional orientation with respect to the sun.

2. A solar stove apparatus comprising in combination:
   a base assembly of a non-conductive material with a reflective foil lining on an inner face thereof, said base assembly having a symmetrical ten sided bottom wall with petaloid panels connected to each side of the bottom wall, each said petaloid panel having an inner and outer portion, said inner portion being connected to a side of the bottom wall so as to extend normally away therefrom and each outer portion being hingedly connected to the associated inner portion for movement between a folded position wherein each of the panels are in stacked relationship with each other overlying the bottom wall and an unfolded position wherein the panels are in adjacent edge-to-edge relationship diverging outwardly from the associated inner portion,
   attachment means extending through adjacent panels in the unfolded position to releasably attach the panels in edge-to-edge relationship,
   a spacer insert of a non-conductive material having a reflective foil lining on an inner face thereof, said spacer insert being seated on the bottom wall of said base assembly,
   a liner element of a non-conductive material having a reflective foil lining on an inner face thereof, said liner element having a ten sided bottom wall conforming in configuration to the bottom wall of the base assembly and tabs connected to each side of the bottom wall so as to extend normally away therefrom in abutting relationship with the inner portions of the petaloid panels,
   a window element having a transparent window pane with an aperture therethrough and peripheral frame members of a non-conductive material on opposite sides of the window pane, said window element adapted to be seated on the tabs of said liner element in spaced relation from the bottom wall of the liner element,
   a direction finder comprised of an elongated pin with a disc therearound extending normally away from the pin, said pin being inserted in said aperture in the window pane with said disc abutting the window pane,
   a retention band of a non-conductive material defining a ten sided ring tightly fitted around the outside of the inner portions of the petaloid panels, and
   strap means anchored to said base assembly and adapted to pass over the petaloid panels when the panels are in the folded position to retain the panels in the folded position.

3. A solar stove apparatus comprising in combination:
   a base assembly having an open-topped box-like oven portion,
   a plurality of identical reflective panels pivotally attached to the oven portion for movement between a folded position overlying the open top of the oven portion in stacked relationship with each other and an unfolded position in which they diverge upwardly and outwardly from the open top of the oven portion,
   a transparent window element removably covering the open top of the oven portion to selectively enclose the oven portion whereby when said panels are in the unfolded position they are adapted to reflect solar radiation through the window element and into the oven portion of the apparatus; and
   said window elment having an opening therethrough and further including a pin releasably inserted in said opening in the window element so as to extend normal to the window element whereby said solar stove apparatus can be aligned with the sun by orienting the said solar apparatus until said pin does not cast a shadow.

4. A solar stove apparatus comprising in combination:
   a plurality of identical solar-reflective panels,
   a base assembly of a non-conductive material with a reflective lining on the inner face thereof, said base assembly having a bottom wall with a plurality of symmetrical edges, one of said reflective panels being connected to each of said symmetrical edges,
   attachment means extending through adjacent reflective panels in the unfolded position to releasably attach the panels in edge-to-edge relationship to one another,
   a retention band of a non-conductive material defining a ring tightly fitting and conforming to the outside of the bottom portions of the said reflective panels,
   an oven of a non-conductive material having a reflective lining on an inner face thereof, said oven having a bottom wall portion with a plurality of edges substantially conforming in configuration to the said plurality of symmetrical bottom wall edges of said base assembly and tabs connected to each side of said bottom wall portion of said oven so as to extend normally away therefrom in abutting relationship with the inner portions of said reflective panels, a transparent window element removably covering the open top of said oven to selectively enclose the said oven whereby when the said solar-reflective panels are in the unfolded position they are adapted to reflect solar radiation through the said window element and into the oven portion of the apparatus, and releasable strap means anchored to said base assembly and adapted to pass over said reflective panels when said reflective panels are folded in stacked relationship with each panel overlying another panel to retain said reflective panels in said stacked relationship.

5. The solar stove apparatus of claim 4 wherein said reflective panels are generally concave petaloid in shape.

6. The solar stove apparatus of claim 5 wherein said petaloid panels are ten in number.

7. The solar stove apparatus of claim 4 wherein said window element has an opening therethrough and further including a pin inserted in said opening in the said window element so as to extend normal to the said window element whereby said base assembly and can be adjusted in relation to the sun until said pin does not cast a shadow.

8. In the solar stove apparatus of claim 7 wherein said pin is releasably inserted such that when said pin does not cast said shadow the said pin is removed and said opening serves as a vent to prevent pressure build-up in said oven.

9. The solar stove apparatus of claim 4 further incomprising:

a spaced insert of a non-conductive material having on an inner face thereof, said spacer insert being seated on the said bottom wall with the edges substantially conforming to said bottom wall edges of said base assembly, side insulation comprising, in the direction from the interior of said oven to the exterior of said side walls of said base assembly, a first reflective side lining and a first non-conductive side layer comprising the said tab portion of said oven, a second reflective side lining and a second non-conductive side layer comprising the lower portion of said reflective panel, and a third non-conducting layer comprising the said retention band, and bottom insulation comprising, in the direction from the interior of said oven to the exterior of said bottom wall of said base assembly, a first reflective bottom lining and a first non-conductive bottom layer comprising the said bottom wall of said oven, a second reflective bottom lining and a second non-conductive bottom layer comprising the said spacer insert, and a third reflective bottom lining and a third non-conductive layer comprising the said bottom wall of said base assembly.

* * * * *